(12) United States Patent
Pringle, IV et al.

(10) Patent No.: US 11,850,619 B2
(45) Date of Patent: *Dec. 26, 2023

(54) ROBOT END EFFECTOR FOR DISPENSING AN EXTRUDABLE SUBSTANCE

(71) Applicant: The Boeing Company, Chicago, IL (US)

(72) Inventors: John Walter Pringle, IV, Torrance, CA (US); Angelica Davancens, Reseda, CA (US); Ryan Vutha Touch, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/470,555

(22) Filed: Sep. 9, 2021

(65) Prior Publication Data

US 2022/0288613 A1    Sep. 15, 2022

Related U.S. Application Data

(60) Provisional application No. 63/161,204, filed on Mar. 15, 2021.

(51) Int. Cl.
| | | |
|---|---|---|
| B05B 7/04 | (2006.01) | |
| B25J 15/00 | (2006.01) | |
| B05B 7/26 | (2006.01) | |
| B05B 7/12 | (2006.01) | |
| B01F 25/42 | (2022.01) | |
| B01F 101/00 | (2022.01) | |

(52) U.S. Cl.
CPC ............ *B05B 7/0408* (2013.01); *B01F 25/42* (2022.01); *B05B 7/12* (2013.01); *B05B 7/26* (2013.01); *B25J 15/0019* (2013.01); *B01F 2101/2305* (2022.01)

(58) Field of Classification Search
CPC . B05B 7/26; B05B 7/0408; B05B 7/12; B01F 25/431; B01F 33/84; B01F 35/71745; B01F 2101/36; B05C 5/0225; B05C 5/0216; B05C 11/1036; B25J 15/0019
See application file for complete search history.

(56) References Cited

U.S. PATENT DOCUMENTS

| | | | | | |
|---|---|---|---|---|---|
| 4,433,795 | A | * | 2/1984 | Maiefski | ............... G07F 13/065 222/14 |
| 9,316,216 | B1 | * | 4/2016 | Cook | ..................... F04B 13/02 |

(Continued)

*Primary Examiner* — Vishal Pancholi
(74) *Attorney, Agent, or Firm* — Kwan & Olynick LLP

(57) ABSTRACT

A robot end effector (100) for dispensing an extrudable substance (102) comprises a chassis (110), a static mixer (101), and cartridge bays (122), extending from the chassis (110). Each of the cartridge bays (122) is shaped to receive a corresponding one of the two-part cartridges (104). Fluidic communication between the selected one of the two-part cartridges (104) and the static mixer (101) is established when the cartridge bays (122) are moved to a predetermined position with respect to the chassis (110). The robot end effector (100) comprises a dispensing valve (130), attached to the chassis (110), and a head assembly (150), comprising pairs of fittings (152). Each of the pairs of fittings (152) is configured to selectively supply compressed air from a pressure source (199) to contents of a corresponding one of the two-part cartridges (104).

20 Claims, 10 Drawing Sheets

(56) References Cited

U.S. PATENT DOCUMENTS

| | | | |
|---|---|---|---|
| 2004/0255560 A1* | 12/2004 | Noble | B29B 7/7433 |
| | | | 53/469 |
| 2016/0114348 A1* | 4/2016 | Cheung | B05C 5/0225 |
| | | | 222/333 |
| 2018/0045745 A1* | 2/2018 | Holmes | B01L 3/0279 |
| 2019/0151882 A1* | 5/2019 | Tritt | G05B 15/02 |
| 2020/0222319 A1* | 7/2020 | Rönnback | B01F 33/821 |

\* cited by examiner

ROBOT END EFFECTOR FOR DISPENSING AN EXTRUDABLE SUBSTANCE

CROSS-REFERENCE TO RELATED APPLICATIONS

This application claims the benefit under 35 U.S.C. § 119(e) of U.S. Provisional Patent Application 63/161,204, filed on 2021 Mar. 15, which is incorporated herein by reference in its entirety for all purposes.

GOVERNMENT LICENSE RIGHTS

This invention was made with Government support under contract No. FA8650-12-2-5503 awarded by the Air Force Research Laboratory (AFOSR). The Government has certain rights in this invention.

TECHNICAL FIELD

Described herein are apparatuses and methods for depositing an extrudable substance onto a surface.

BACKGROUND

During assembly of a structure, such as a solar panel or a component of an aircraft or a spacecraft, an extrudable substance must often be deposited from a two-part cartridge onto a surface of the structure. It is desirable to fully automate such deposition of the extrudable substance to reduce cost and manufacturing lead time. It also desirable to use commercial off-the-shelf two-part cartridges to reduce cost. However, in many instances, each commercial off-the-shelf two-part cartridge yields only a relatively small amount of the extrudable substance. In such instances, automation of the deposition process is limited by a frequent need to pause the automated system to manually replace an empty two-part cartridge with a full cartridge.

SUMMARY

Accordingly, apparatuses and methods, intended to address at least the above-identified concerns, would find utility.

The following is a non-exhaustive list of examples of the subject matter, disclosed herein.

Disclosed herein is a robot end effector for dispensing an extrudable substance. The robot end effector comprises a chassis and a mixer housing, extending from the chassis and configured to receive a static mixer. The static mixer comprises a mixer inlet and a mixer outlet, which is in fluidic communication with the mixer inlet. The robot end effector also comprises cartridge bays, extending from the chassis. Each of the cartridge bays is shaped to receive a corresponding one of two-part cartridges. Each one of the two-part cartridges comprises a cartridge outlet. Fluidic communication between the cartridge outlet of a selected one of the two-part cartridges and the mixer inlet is established when the cartridge bays are moved to a predetermined position with respect to the chassis, linearly along a first axis and linearly along a second axis, which is transverse to the first axis. The robot end effector further comprises a dispensing valve, attached to the chassis and comprising a valve inlet and a valve outlet. The valve outlet is in selective fluidic communication with the valve inlet. The mixer housing is configured to position the static mixer with respect to the dispensing valve so that the valve inlet is in fluidic communication with the mixer outlet. The robot end effector also comprises a head assembly, comprising pairs of fittings. Each of the pairs of fittings is configured to selectively supply compressed air from a pressure source to contents of a corresponding one of the two-part cartridges when the two-part cartridges are received by the cartridge bays, and the cartridge bays are translated along the first axis and along the second axis relative to the chassis so that the cartridge outlet of the corresponding one of the two-part cartridges is in fluidic communication with the mixer inlet.

The robot end effector provides for depositing the extrudable substance from the two-part cartridges in a single automated deposition process, eliminating a need to pause, recover, and reload the robot end effector each time a single two-part cartridge is emptied. The cartridge bays enable loading and retention of the two-part cartridges on the robot end effector. The cartridge bays configured to move a selected one of the two-part cartridges to the predetermined position with respect to the chassis and the static mixer, such that the cartridge outlet of the selected one of the two-part cartridges is aligned with the mixer inlet of the static mixer, enables each two-part cartridge to be selectively positioned for extrusion of the contents into the static mixer in one-at-a-time fashion. The head assembly distributes pressure from the pressure source to each of the two-part cartridges selectively to enable extrusion of the extrudable substance selectively from the two-part cartridge that is in the predetermined position for fluid communication with the static mixer. Once the selected one of the two-part cartridges has been emptied of the extrudable substance, the cartridge bays are configured to move a next selected one of the two-part cartridges to the predetermined position with respect to the chassis and the static mixer such that the cartridge outlet of the next selected one of the two-part cartridges is aligned with the mixer inlet of the static mixer. The mixer housing is configured to hold the static mixer firmly in position against the cartridge outlet during extrusion from the selected one of the two-part cartridges.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
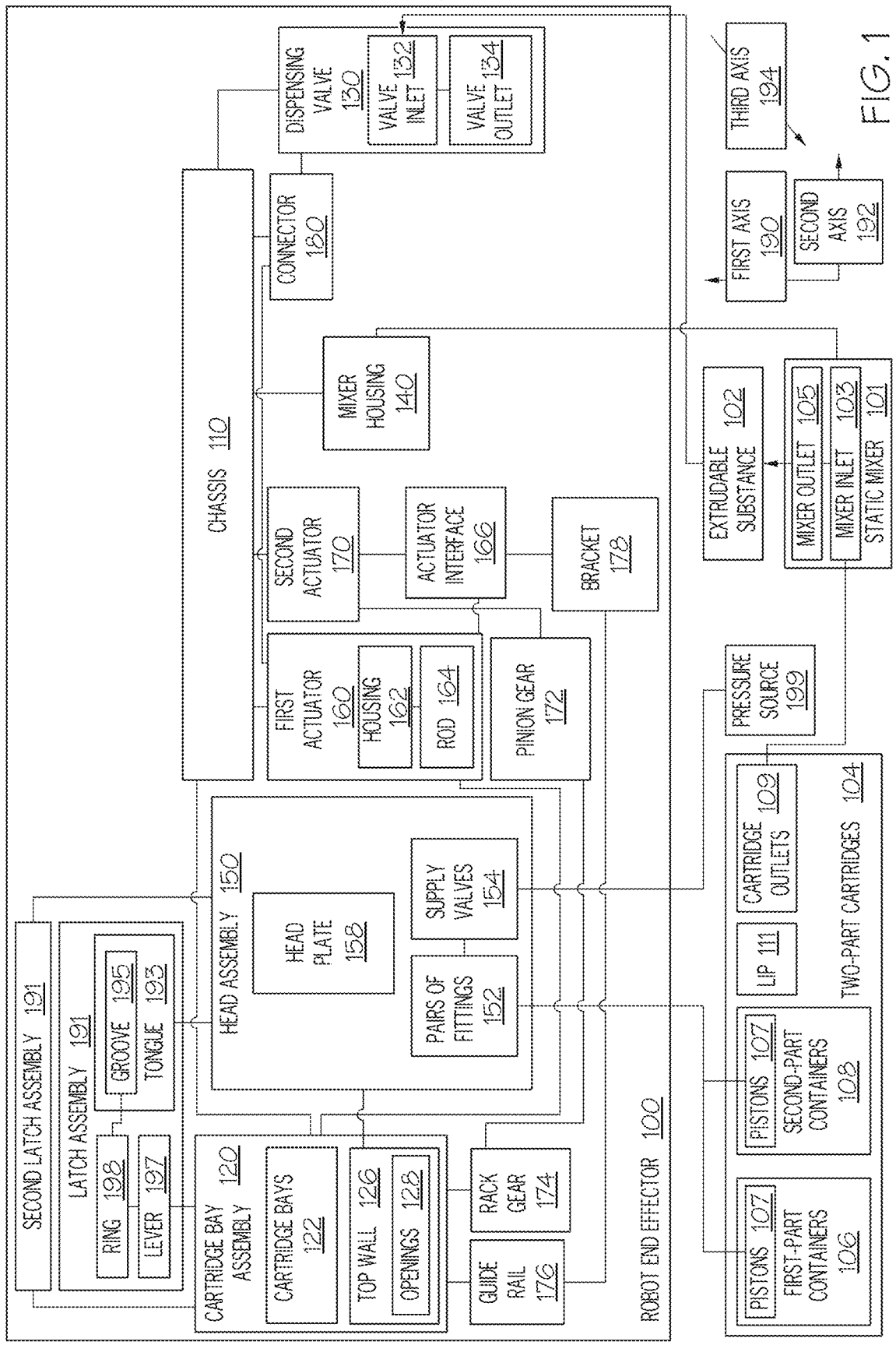
FIG. 1 is a block diagram of a robot end effector for dispensing an extrudable substance, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

For purposes of this disclosure, "along" means "coaxial with or parallel to."

Illustrative, non-exhaustive examples of the subject matter, disclosed herein, are provided below.

Referring generally to FIG. 1 and particularly to, e.g., FIGS. 2-7C for illustrative purposes only and not by way of limitation, robot end effector 100 for dispensing extrudable substance 102 is disclosed. Robot end effector 100 comprises chassis 110 and mixer housing 140, extending from chassis 110 and configured to receive static mixer 101. Static mixer 101 comprises mixer inlet 103 and mixer outlet 105, which is in fluidic communication with mixer inlet 103. Robot end effector 100 also comprises cartridge bays 122, extending from chassis 110. Each of cartridge bays 122 is shaped to receive a corresponding one of two-part cartridges 104. Each one of two-part cartridges 104 comprises cartridge outlet 109. Fluidic communication between cartridge outlet 109 of selected one of two-part cartridges 104 and mixer inlet 103 is established when cartridge bays 122 are moved to predetermined position with respect to chassis 110, linearly along first axis 190 and linearly along second axis 192, which is transverse to first axis 190. Robot end effector 100 further comprises dispensing valve 130, attached to chassis 110 and comprising valve inlet 132 and valve outlet 134. Valve outlet 134 is in selective fluidic communication with valve inlet 132. Mixer housing 140 is configured to position static mixer 101 with respect to dispensing valve 130 so that valve inlet 132 is in fluidic communication with mixer outlet 105. Robot end effector 100 also comprises head assembly 150, comprising pairs of fittings 152. Each of pairs of fittings 152 is configured to selectively supply compressed air from pressure source 199 to contents of corresponding one of two-part cartridges 104 when two-part cartridges 104 are received by cartridge bays 122, and cartridge bays 122 are translated along first axis 190 and along second axis 192 relative to chassis 110 so that cartridge outlet 109 of the corresponding one of two-part cartridges 104 is in fluidic communication with mixer inlet 103. The preceding portion of this paragraph delineates example one of the subject matter, disclosed herein.

Robot end effector 100 provides for depositing extrudable substance 102 from two-part cartridges 104 in a single automated deposition process, eliminating a need to pause, recover, and reload robot end effector 100 each time a single two-part cartridge is emptied. Cartridge bays 122 enable loading and retention of two-part cartridges 104 on robot end effector 100. Cartridge bays 122 configured to move a selected one of two-part cartridges 104 to the predetermined position with respect to chassis 110 and static mixer 101, such that cartridge outlet 109 of the selected one of two-part cartridges 104 is aligned with mixer inlet 103 of static mixer 101, enables each of two-part cartridges 104 to be selectively positioned for extrusion of the contents into static mixer 101 in one-at-a-time fashion. Head assembly 150 distributes pressure from pressure source 199 selectively to each of two-part cartridges 104 to enable extrusion of extrudable substance 102 selectively from one of two-part cartridges 104 that is in the predetermined position for fluid communication with static mixer 101. Once the selected one of two-part cartridges 104 has been emptied of extrudable substance 102, cartridge bays 122 are configured to move the next selected one of two-part cartridges 104 to the predetermined position with respect to chassis 110 and static mixer 101 such that cartridge outlet 109 of the next selected one of two-part cartridges 104 is aligned with mixer inlet 103 of static mixer 101. Mixer housing 140 is configured to hold static mixer 101 firmly in position against cartridge outlet 109 during extrusion from the selected one of two-part cartridges 104.

In one or more examples, two-part cartridges 104 are commercial off-the-shelf items that each include first-part container 106 and second-part container 108. The contents of first-part container 106 and the contents of second-part container 108 are configured to be mixed together to yield extrudable substance 102, such as an adhesive. Typically, the contents of first-part container 106 and second-part container 108 must be kept separate until just before use because extrudable substance 102 solidifies soon after mixing, for example in less than an hour. First-part container 106 and second-part container 108 each include piston 107 disposed internally within and configured to force the respective contents of first-part container 106 and second-part container 108 out of cartridge outlet 109. Each static mixer 101 is typically packaged with a two-part cartridge and is a tube, attachable to cartridge outlet 109. Each static mixer typically includes mixing vanes, configured to enhance mixing of the contents of first-part container 106 and second-part container 108 as they travel through the static mixer, such that extrudable substance 102 is suitably homogeneous upon exit from mixer outlet 105 of static mixer 101.

Figure 2:
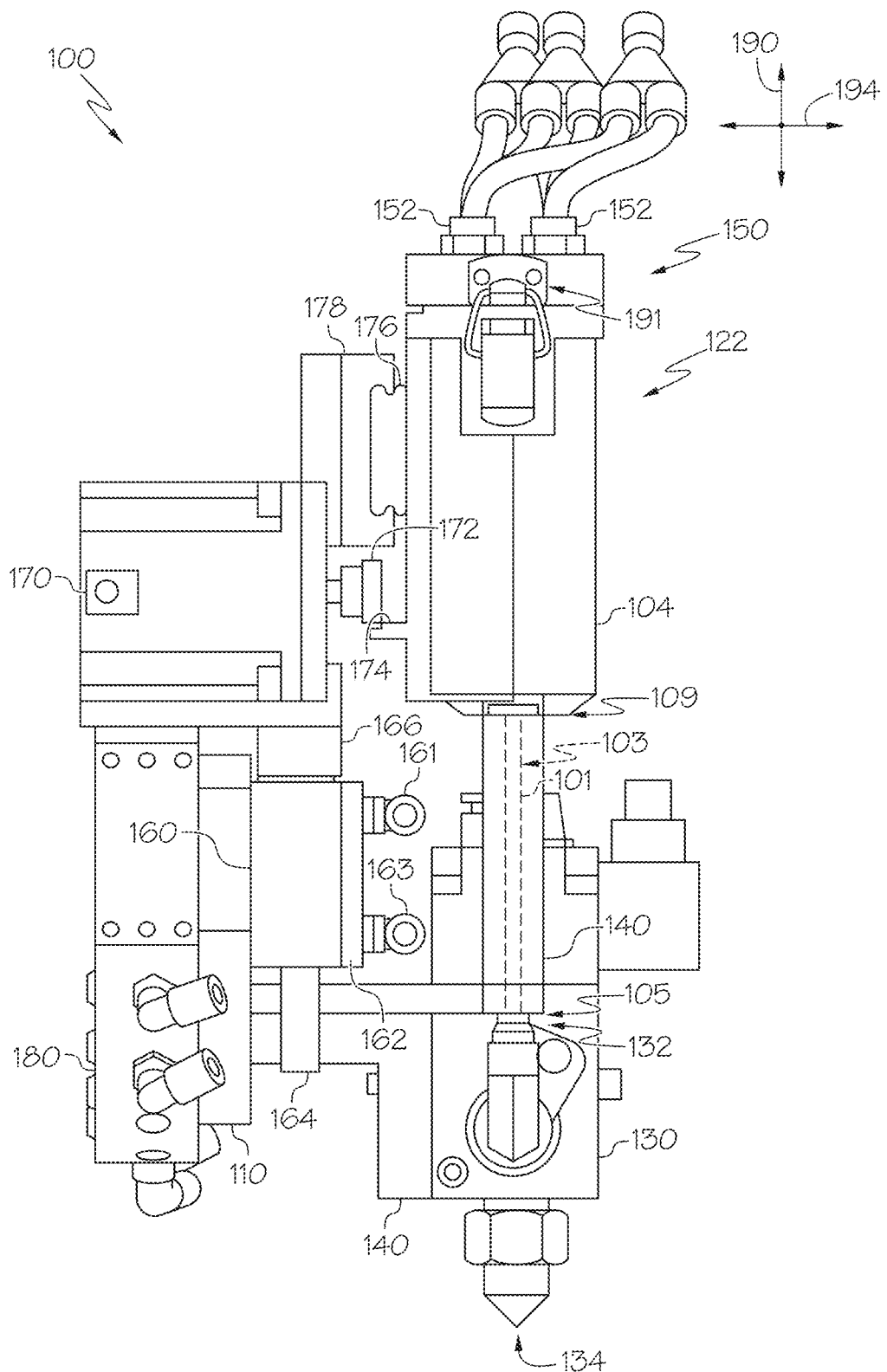
FIG. 2 is a schematic, side elevation view of the robot end effector of FIG. 1, according to one or more examples of the subject matter, disclosed herein.
Figure 7A:
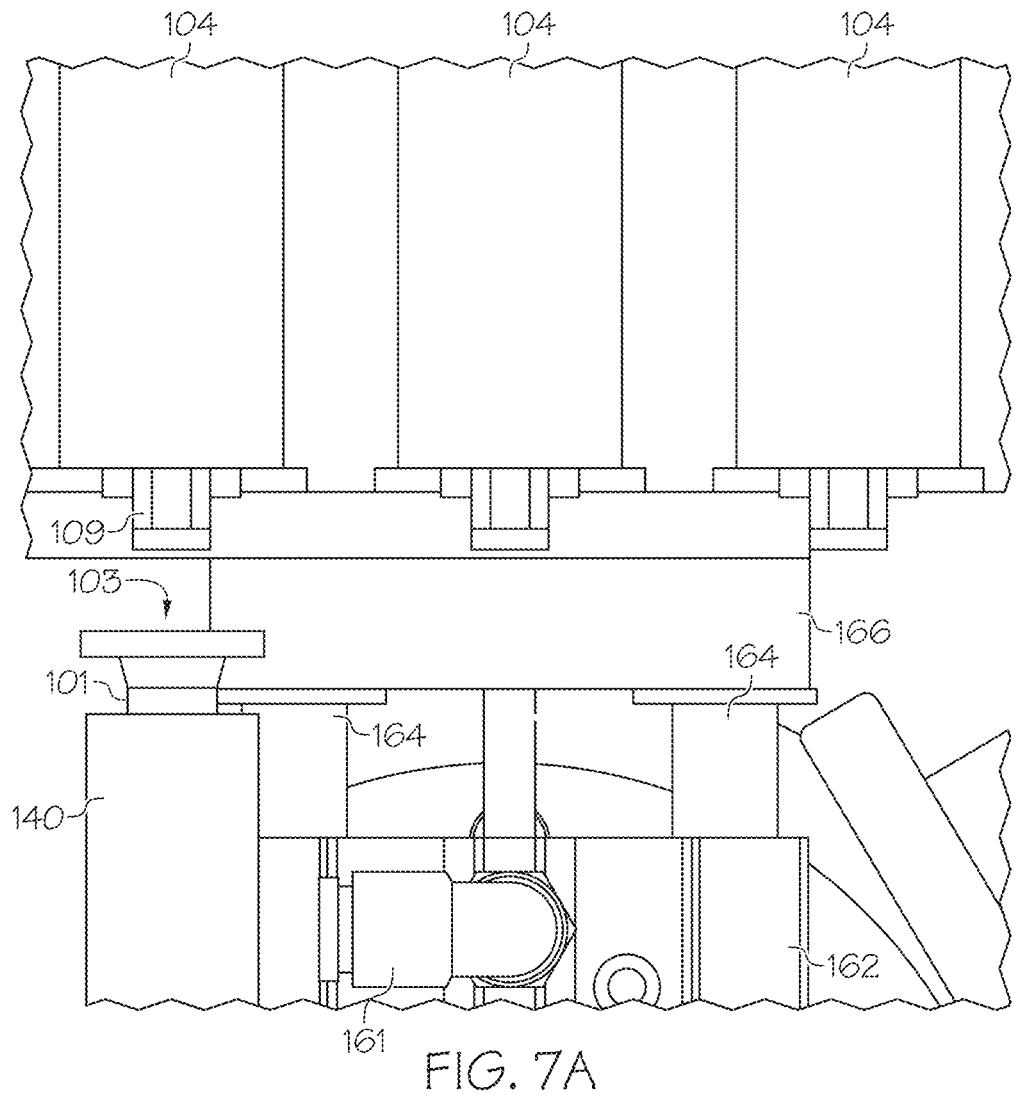
FIG. 7A is a schematic, front elevation view of a portion of the robot end effector of FIG. 1, showing a two-part cartridge, received in a first cartridge bay of the robot end effector, according to one or more examples of the subject matter, disclosed herein.
Figure 7B:
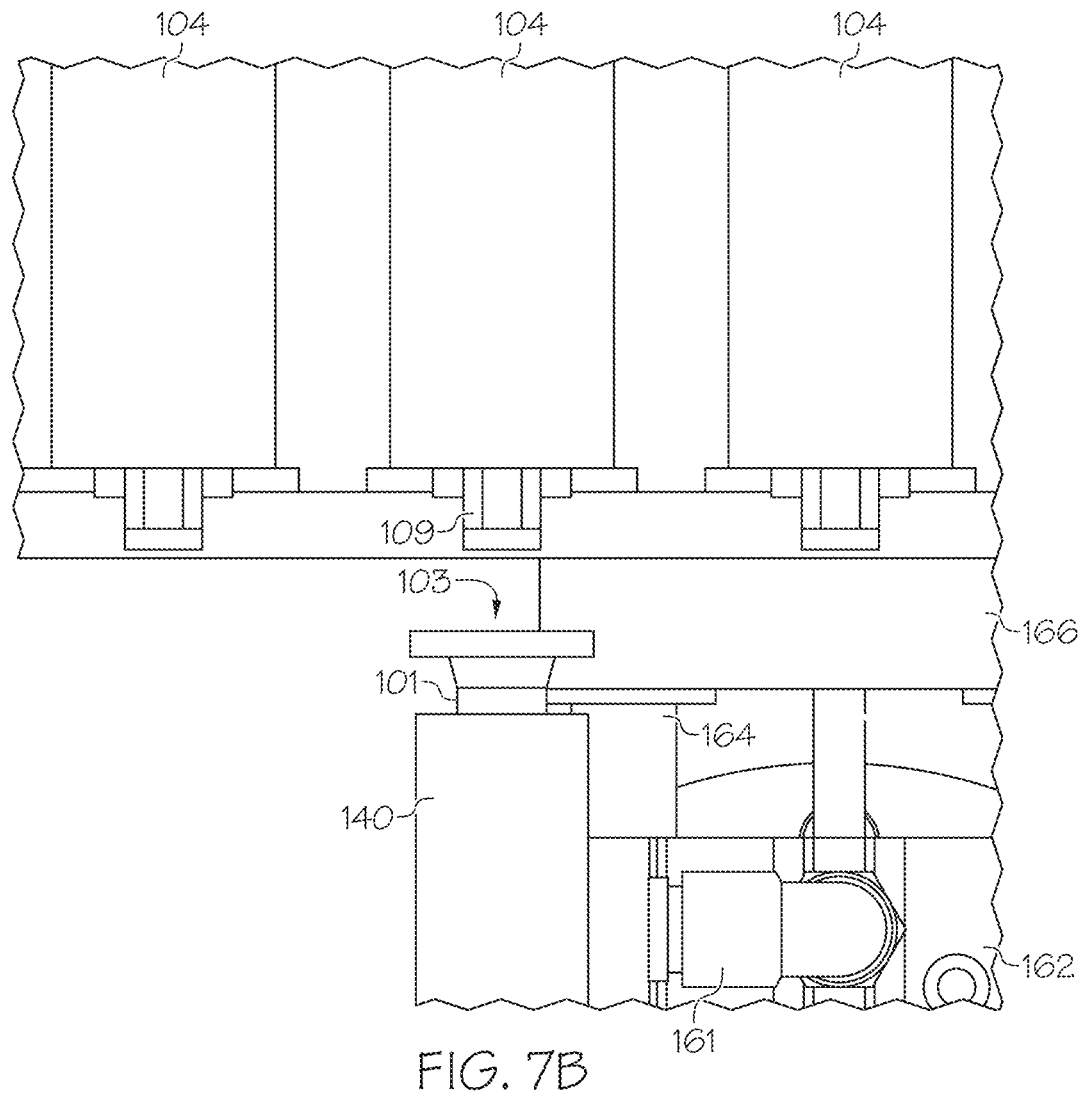
FIG. 7B is a schematic, front elevation view of the portion of the robot end effector shown in FIG. 7A, showing another two-part cartridge, received in a second cartridge bay of the robot end effector, according to one or more examples of the subject matter, disclosed herein.
Figure 7C:
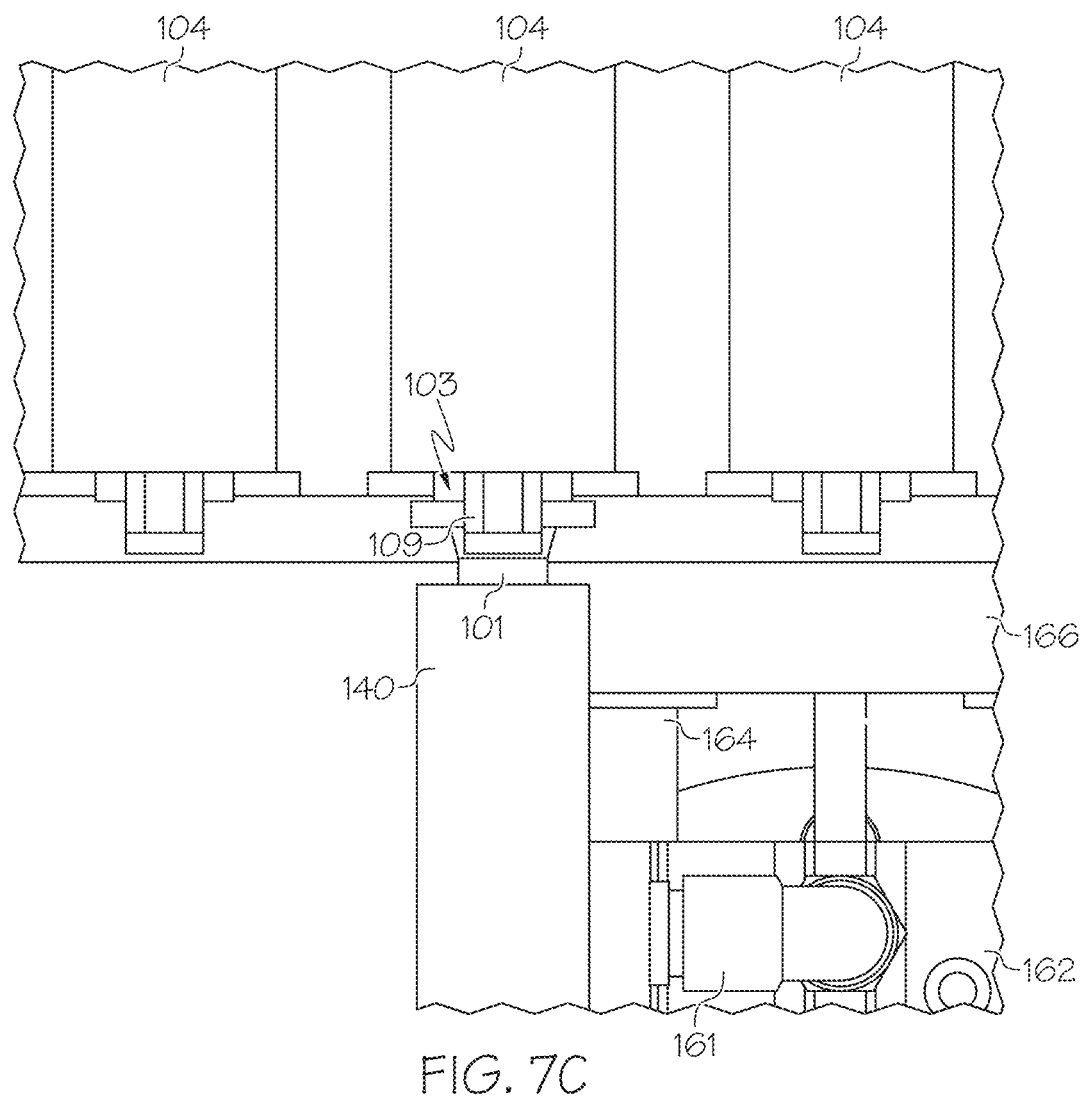
FIG. 7C is a schematic, front elevation view of the portion of the robot end effector shown in FIGS. 7A and 7B, showing a cartridge outlet of the two-part cartridge, received in the second cartridge bay in fluidic communication with a mixer inlet of the static mixer, according to one or more examples of the subject matter, disclosed herein.

Referring generally to FIG. 1 and particularly to, e.g., FIGS. 2, 7B, and 7C, robot end effector 100 further comprises first actuator 160, attached to chassis 110 and operable to bi-directionally move cartridge bays 122 relative to chassis 110 along first axis 190. The preceding portion of this paragraph delineates example two of the subject matter, disclosed herein, where example two also encompasses example one, above.

First actuator 160 enables bi-directional movement of cartridge bays 122 relative to chassis 110 along first axis 190 such that, when a selected one of cartridge bays 122 is moved into alignment with static mixer 101, cartridge outlet 109 of the corresponding one of two-part cartridges 104 is movable along first axis 190 into and out of fluid communication with mixer inlet 103.

Referring generally to FIG. 1 and particularly to, e.g., FIGS. 7B and 7C, first actuator 160 is selectively operable to compress static mixer 101 between cartridge outlet 109 and valve inlet 132 by moving cartridge bays 122 relative to chassis 110, so that mixer inlet 103 is fluidically coupled with cartridge outlet 109 of selected one of two-part cartridges 104 while compressed air is supplied to the contents of the selected one of two-part cartridges 104. The preceding portion of this paragraph delineates example three of the subject matter, disclosed herein, where example three also encompasses example two, above.

First actuator 160 being selectively operable to compress static mixer 101 between cartridge outlet 109 and valve inlet 132 enables static mixer 101 to be maintained in position against the force of the pressurized flow of the extruded contents into mixer inlet 103.

Referring generally to FIG. 1 and particularly to, e.g., FIGS. 7B and 7C, first actuator 160 is selectively operable to move cartridge bays 122, relative to chassis 110, along first axis 190 away from the predetermined position to fluidically decouple mixer inlet 103 from cartridge outlet 109 of the selected one of two-part cartridges 104. The preceding portion of this paragraph delineates example four of the subject matter, disclosed herein, where example four also encompasses example two or three, above.

First actuator 160 being selectively operable to move cartridge bays 122, relative to chassis 110, along first axis 190 away from the predetermined position to fluidically decouple mixer inlet 103 from cartridge outlet 109 enables spacing of cartridge outlet 109 of the corresponding one of two-part cartridges 104 away from mixer inlet 103 to avoid mechanical interference as the next one of cartridge bays 122 is moved into alignment with static mixer 101.

Referring generally to FIG. 1 and particularly to, e.g., FIG. 2, first actuator 160 is pneumatically activated. The preceding portion of this paragraph delineates example five of the subject matter, disclosed herein, where example five also encompasses any one of examples two to four, above.

Pneumatic actuation of first actuator 160 enables accurate positioning of cartridge bays 122 along first axis 190 in a relatively inexpensive fashion, for example using air supplied through connector 180 of robot end effector 100.

Referring generally to FIG. 1 and particularly to, e.g., FIGS. 2, 7A, 7B, and 7C, first actuator 160 comprises housing 162, fixed to chassis 110, and rod 164, oriented parallel to first axis 190 and translatable relative to housing 162 along first axis 190. The preceding portion of this paragraph delineates example six of the subject matter, disclosed herein, where example six also encompasses any one of examples two to five, above.

Housing 162 attached to chassis 110, and rod 164 oriented parallel to first axis 190 and translatable relative to housing 162 along first axis 190, provide a mechanically simple and effective implementation of first actuator 160.

In some examples, first actuator 160 is pneumatically activated, and housing 162 comprises retraction inlet port 161 and extension inlet port 163. First actuator 160 is configured to move rod 164, and therefore cartridge bays 122, along first axis 190 towards mixer housing 140 in response to pressurized air, supplied to retraction inlet port 161. Rod 164 in a resulting retracted position is shown in FIG. 2. First actuator 160 is configured to move rod 164, and therefore cartridge bays 122, along first axis 190 away from mixer housing 140 in response to pressurized air supplied to extension inlet port 163. Rod 164 in a resulting extended position is shown in FIG. 7A. Retraction inlet port 161 and extension inlet port 163 facilitate efficient actuation of first actuator 160 within spatial constraints for operation of robot end effector 100.

Figure 3:
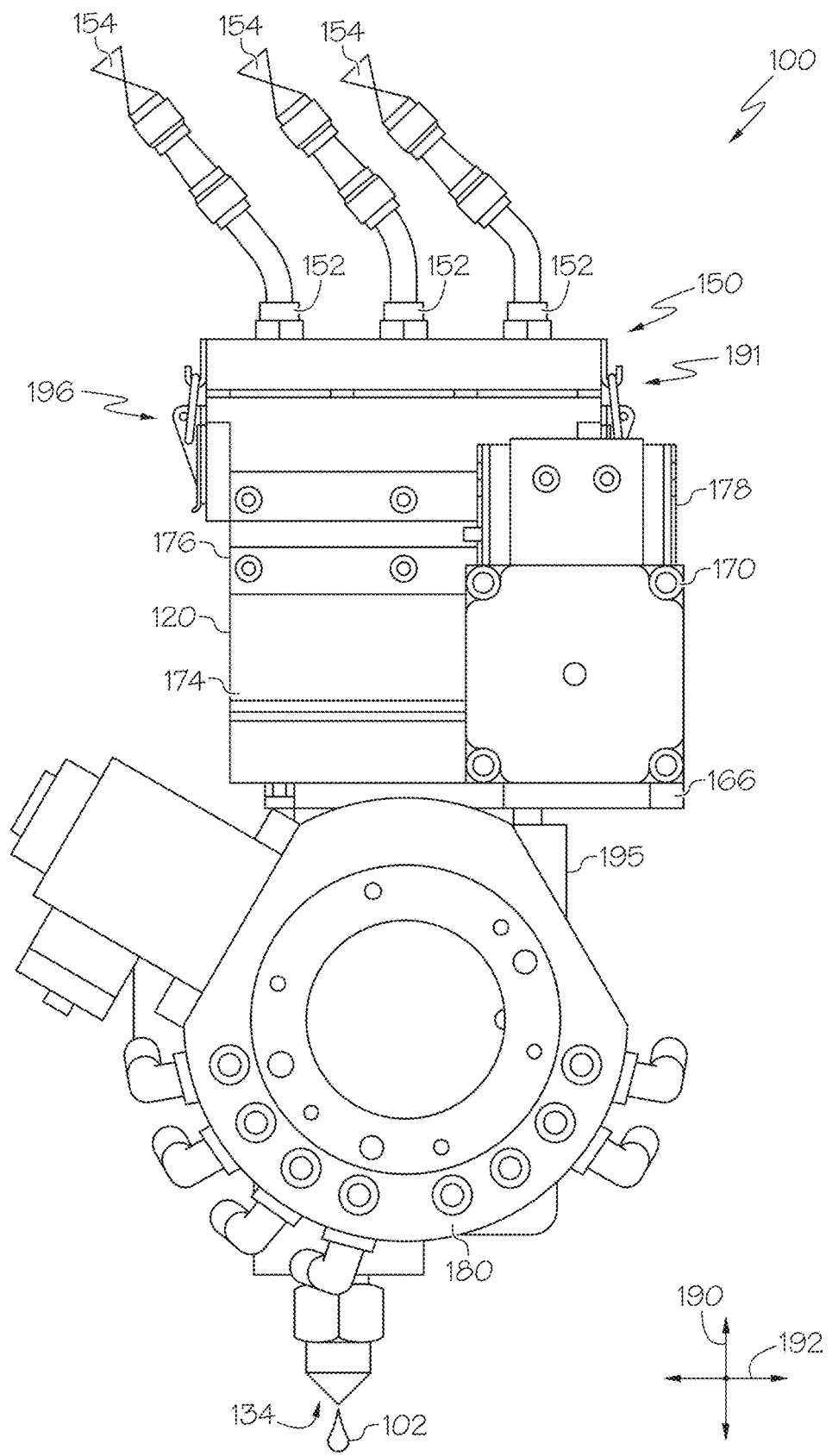
FIG. 3 is a schematic, rear elevation view of the robot end effector of FIG. 1, according to one or more examples of the subject matter, disclosed herein.
Figure 4:
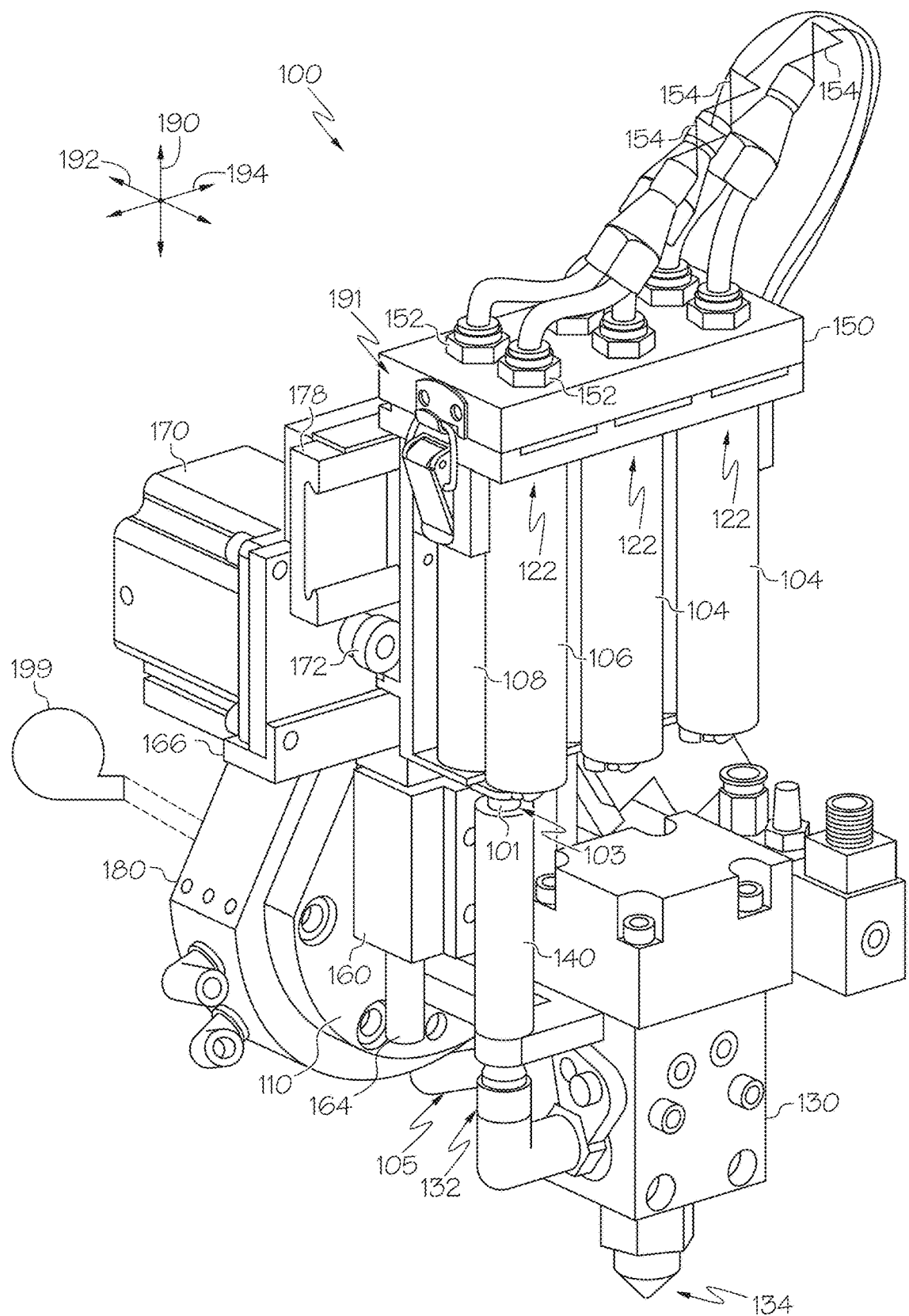
FIG. 4 is a schematic, perspective view of the robot end effector of FIG. 1, according to one or more examples of the subject matter, disclosed herein.

Referring generally to FIG. 1 and particularly to, e.g., FIGS. 2, 3, and 4, robot end effector 100 further comprises actuator interface 166, mounted on rod 164, and second actuator 170, mounted on actuator interface 166 and operable to bi-directionally move cartridge bays 122 relative to chassis 110 along second axis 192. The preceding portion of this paragraph delineates example seven of the subject matter, disclosed herein, where example seven also encompasses example six, above.

Second actuator 170 being operable to bi-directionally move cartridge bays 122 relative to chassis 110 along second axis 192 enables each of cartridge bays 122 to be selectively positioned in alignment with static mixer 101 received in mixer housing 140. Actuator interface 166 enables mechanically simple and effective cooperation between first actuator 160 and second actuator 170 to move cartridge bays 122 to the predetermined position with respect to chassis 110 to establish fluidic communication between cartridge outlet 109 of the selected one of two-part cartridges 104 and mixer inlet 103.

Referring generally to FIG. 1 and particularly to, e.g., FIGS. 2, 7A, and 7B, robot end effector 100 further comprises second actuator 170, attached to chassis 110 and operable to bi-directionally move cartridge bays 122 relative to chassis 110 along second axis 192. The preceding portion of this paragraph delineates example eight of the subject matter, disclosed herein, where example eight also encompasses any one of examples two to five, above.

Second actuator 170 being operable to bi-directionally move cartridge bays 122 relative to chassis 110 along second axis 192 enables each of cartridge bays 122 to be selectively positioned in alignment with static mixer 101 received in mixer housing 140.

Referring generally to FIG. 1 and particularly to, e.g., FIG. 2, robot end effector 100 further comprises connector 180, attached to chassis 110. Dispensing valve 130, first actuator 160, and second actuator 170 are controllable by signals, received through connector 180. The preceding portion of this paragraph delineates example nine of the subject matter, disclosed herein, where example nine also encompasses example eight, above.

Connector 180 facilitates simple and efficient electrical connection of dispensing valve 130, first actuator 160, and second actuator 170 to a source of control signals. In one or more examples, the control signals control first actuator 160 and second actuator 170 to move cartridge bays 122 relative to chassis 110 along first axis 190 and second axis 192 to the predetermined position with respect to chassis 110 and static mixer 101, and/or to decouple cartridge outlet 109 from mixer inlet 103 and move the next one of cartridge bays 122 into alignment with static mixer 101. In one or more examples, the control signals control dispensing valve 130 to deposit extrudable substance 102 via valve outlet 134.

In one or more examples, connector 180 is a quick-change connector, configured to interface mechanically with an arm of a robot (not shown), so as to attach robot end effector 100 physically to the robot, and electrically with a control system (not shown) of the robot, so as to enable and integrate control of dispensing valve 130, first actuator 160, and second actuator 170 with the control logic of the robot.

Referring generally to FIG. 1 and particularly to, e.g., FIG. 2, second actuator 170 is a stepper motor. The preceding portion of this paragraph delineates example ten of the subject matter, disclosed herein, where example ten also encompasses example eight or nine, above.

Implementation of second actuator 170 as a stepper motor enables precise and accurate positioning of cartridge bays 122 along second axis 192.

Referring generally to FIG. 1 and particularly to, e.g., FIGS. 2, 3, and 4, robot end effector 100 further comprises actuator interface 166. First actuator 160 is configured to translate actuator interface 166 relative to chassis 110. Second actuator 170 is operable to bi-directionally move cartridge bays 122 relative to actuator interface 166 along second axis 192. The preceding portion of this paragraph delineates example eleven of the subject matter, disclosed herein, where example eleven also encompasses any one of examples eight to ten, above.

Actuator interface 166 enables mechanically simple and effective cooperation between first actuator 160 and second actuator 170 to move cartridge bays 122 to the predetermined position with respect to chassis 110 to establish fluidic communication between cartridge outlet 109 of the selected one of two-part cartridges 104 and mixer inlet 103.

Referring generally to FIG. 1 and particularly to, e.g., FIGS. 2, 3, and 4, robot end effector 100 further comprises guiderail 176, mounted to cartridge bays 122, and bracket 178, fixed to actuator interface 166 and movable relative to guiderail 176 along second axis 192. The preceding portion of this paragraph delineates example twelve of the subject matter, disclosed herein, where example twelve also encompasses example eleven, above.

Guiderail 176 mounted to cartridge bays 122 and bracket 178 fixed to actuator interface 166 cooperate to improve stability of movement of cartridge bays 122 relative to chassis 110.

Referring generally to FIG. 1 and particularly to, e.g., FIGS. 2, 3, and 4, robot end effector 100 further comprises pinion gear 172 and rack gear 174, mounted to cartridge bays 122 and in mesh with pinion gear 172. Second actuator 170 is operable to selectively rotate pinion gear 172 to selectively move cartridge bays 122 relative to chassis 110 along second axis 192. The preceding portion of this paragraph delineates example thirteen of the subject matter, disclosed herein, where example thirteen also encompasses any one of examples eight to twelve, above.

Pinion gear 172 and rack gear 174 cooperate to provide a mechanically simple and efficient transfer of force from second actuator 170 to cartridge bays 122.

Figure 6A:
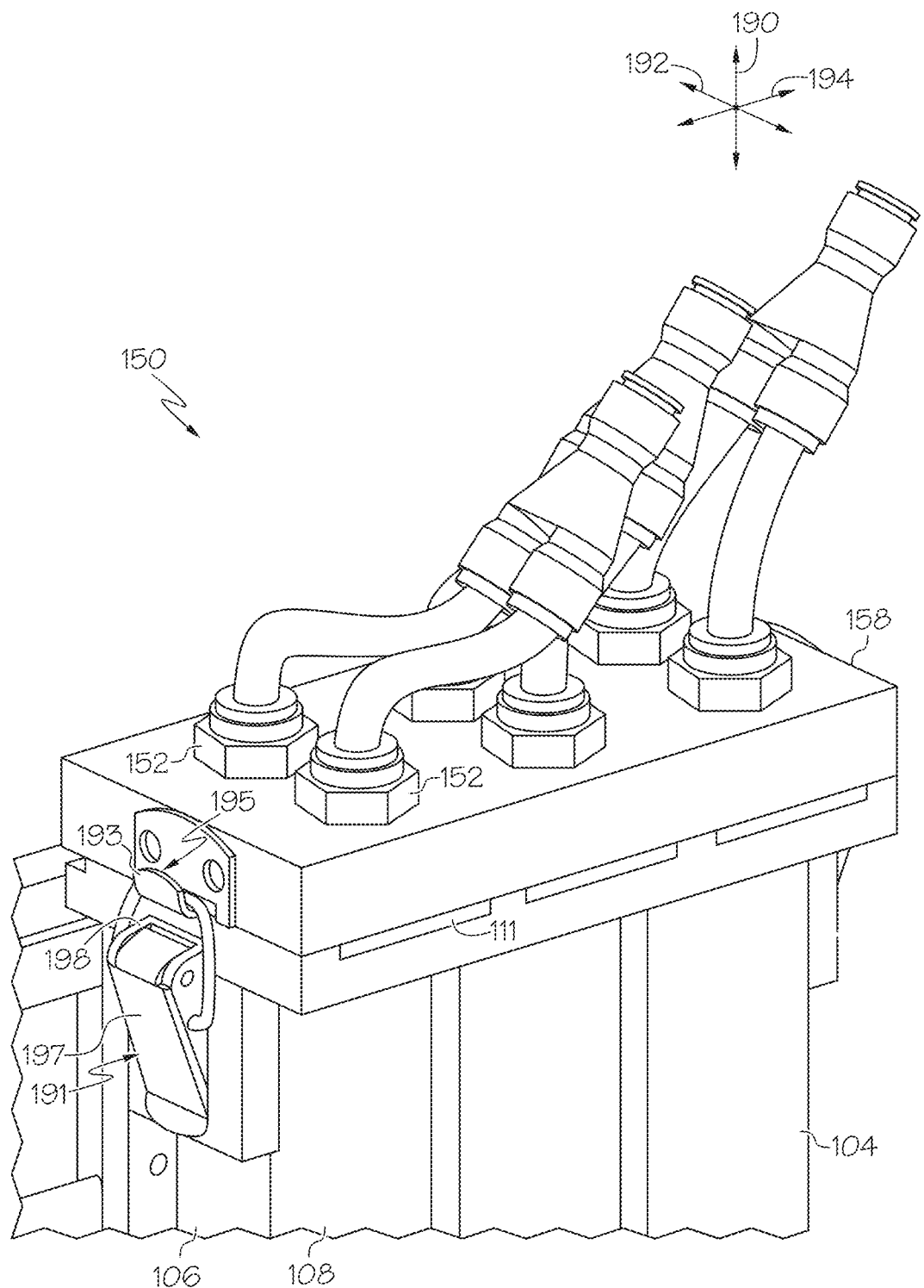
FIG. 6A is a schematic, perspective, view of a portion of the robot end effector of FIG. 1, showing a head assembly of the robot end effector in a latched position, according to one or more examples of the subject matter, disclosed herein.
Figure 6B:
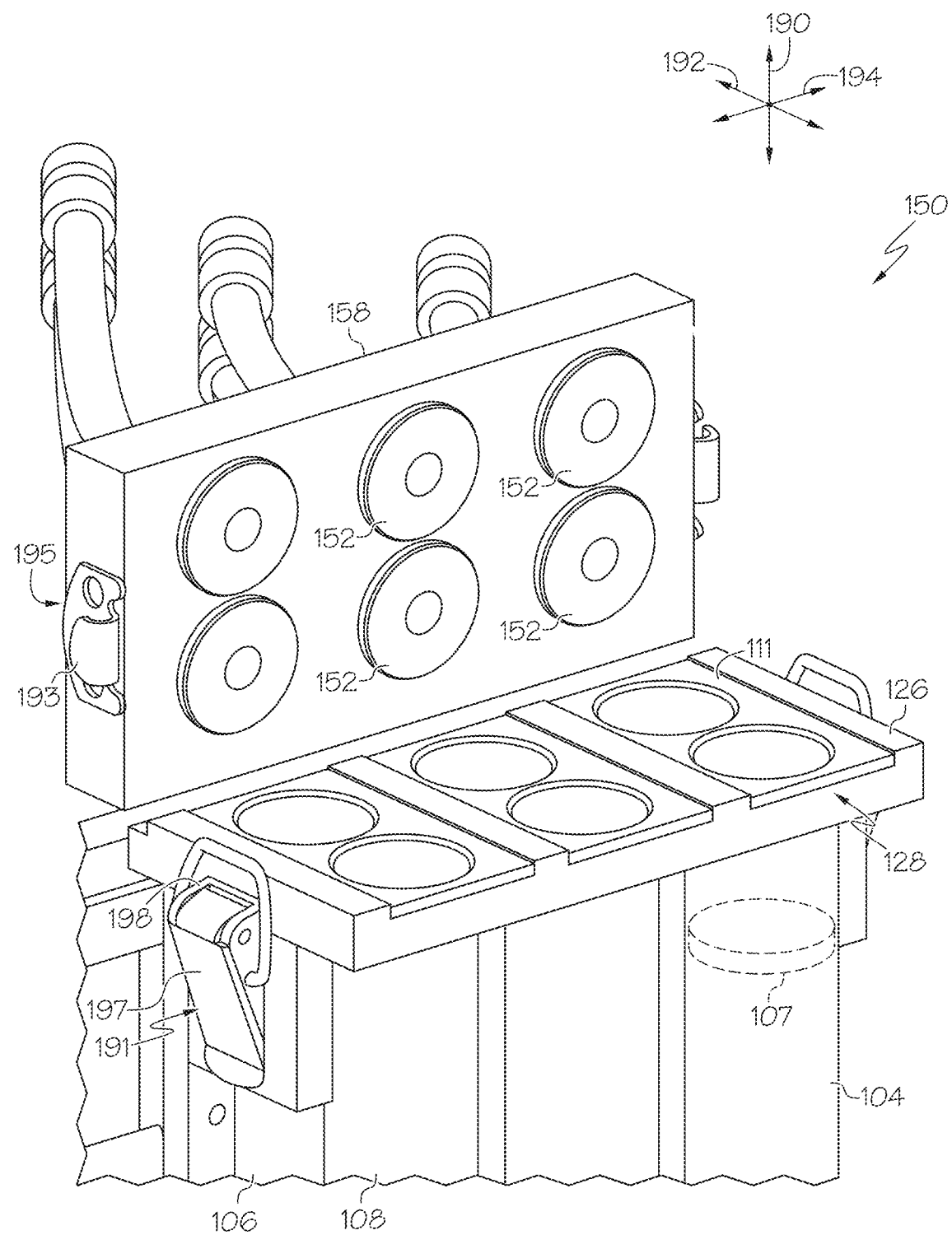
FIG. 6B is a schematic, perspective, view of the portion of the robot end effector, shown in FIG. 6A, showing the head assembly in an unlatched position, according to one or more examples of the subject matter, disclosed herein.

Referring generally to FIG. 1 and particularly to, e.g., FIGS. 6A and 6B, head assembly 150 is attached directly to cartridge bays 122. The preceding portion of this paragraph delineates example fourteen of the subject matter, disclosed herein, where example fourteen also encompasses any one of examples one to thirteen, above.

Head assembly 150 being attached directly to cartridge bays 122 reduces the mechanical complexity of robot end effector 100 and facilitates easy insertion and removal of two-part cartridges 104 from robot end effector 100.

Referring generally to FIG. 1 and particularly to, e.g., FIGS. 6A and 6B, robot end effector 100 further comprises latch assembly 191. Latch assembly 191 comprises tongue 193, lever 197, and ring 198. Tongue 193 is fixed to one of head assembly 150 or cartridge bays 122 and comprises groove 195. Lever 197 is pivotally mounted to the other one of head assembly 150 or cartridge bays 122. Ring 198 is pivotally mounted to lever 197 and is configured to be received in groove 195. When ring 198 is received in groove 195, lever 197 is operable to selectively tension ring 198 against groove 195 such that head assembly 150 is secured to cartridge bays 122. The preceding portion of this paragraph delineates example fifteen of the subject matter, disclosed herein, where example fifteen also encompasses any one of examples one to fourteen, above.

Latch assembly 191 including tongue 193, lever 197, and ring 198 provides a hand-operable, mechanically simple, and intuitive mechanism for attachment and removal of head assembly 150 and facilitates easy insertion and removal of two-part cartridges 104 from robot end effector 100.

Referring generally to FIG. 1 and particularly to, e.g., FIGS. 3, 6A, and 6B, robot end effector 100 further comprises second latch assembly 196, positioned opposite latch assembly 191 along second axis 192. The preceding portion of this paragraph delineates example sixteen of the subject matter, disclosed herein, where example sixteen also encompasses example fifteen, above.

Second latch assembly 196, in combination with latch assembly 191, provides a hand-operable, mechanically simple, and intuitive mechanism for attachment and removal of head assembly 150 and facilitates easy insertion and removal of two-part cartridges 104 from robot end effector 100.

Referring generally to FIG. 1 and particularly to, e.g., FIG. 6B, cartridge bays 122 collectively form cartridge-bay assembly 120. Cartridge-bay assembly 120 comprises top wall 126 and openings 128, defined in top wall 126 and configured to receive two-part cartridges 104 therethrough into cartridge bays 122. The preceding portion of this paragraph delineates example seventeen of the subject matter, disclosed herein, where example seventeen also encompasses any one of examples one to sixteen, above.

Openings 128 defined in top wall 126 of cartridge-bay assembly 120 facilitate easy insertion and removal of two-part cartridges 104 from robot end effector 100

Referring generally to FIG. 1 and particularly to, e.g., FIGS. 5A, 5B, 6A, and 6B, head assembly 150 further comprises head plate 158. Each of two-part cartridges 104 further comprises lip 111, configured to be sandwiched between head plate 158 and top wall 126 when two-part cartridges 104 are received in cartridge bays 122. The preceding portion of this paragraph delineates example eighteen of the subject matter, disclosed herein, where example eighteen also encompasses example seventeen, above.

In one or more examples, each of two-part cartridges 104 includes lip 111 as a standard feature, extending around a perimeter of the top end of first-part container 106 and second-part container 108.

Sandwiching lip 111 between head plate 158 and top wall 126 when two-part cartridges 104 are received in cartridge bays 122 provides a simple retention mechanism for two-part cartridges 104 that accommodates a wide dimensional tolerance for two-part cartridges 104.

Referring generally to FIG. 1 and particularly to, e.g., FIG. 4, head assembly 150 further comprises supply valves 154. Each of supply valves 154 is operable to selectively establish fluidic communication between pressure source 199 and a corresponding one of pairs of fittings 152. The preceding portion of this paragraph delineates example nineteen of the subject matter, disclosed herein, where example nineteen also encompasses any one of examples one to eighteen, above.

Supply valves 154 each operable to selectively establish fluidic communication between pressure source 199 and a corresponding one of pairs of fittings 152 enables each of two-part cartridges 104 to be pressurized, in one-at-a-time fashion, when the corresponding one of cartridge bays 122, in which a given one of two-part cartridges 104 is received, is selectively moved to the predetermined position to establish fluidic communication with static mixer 101.

Figure 5B:
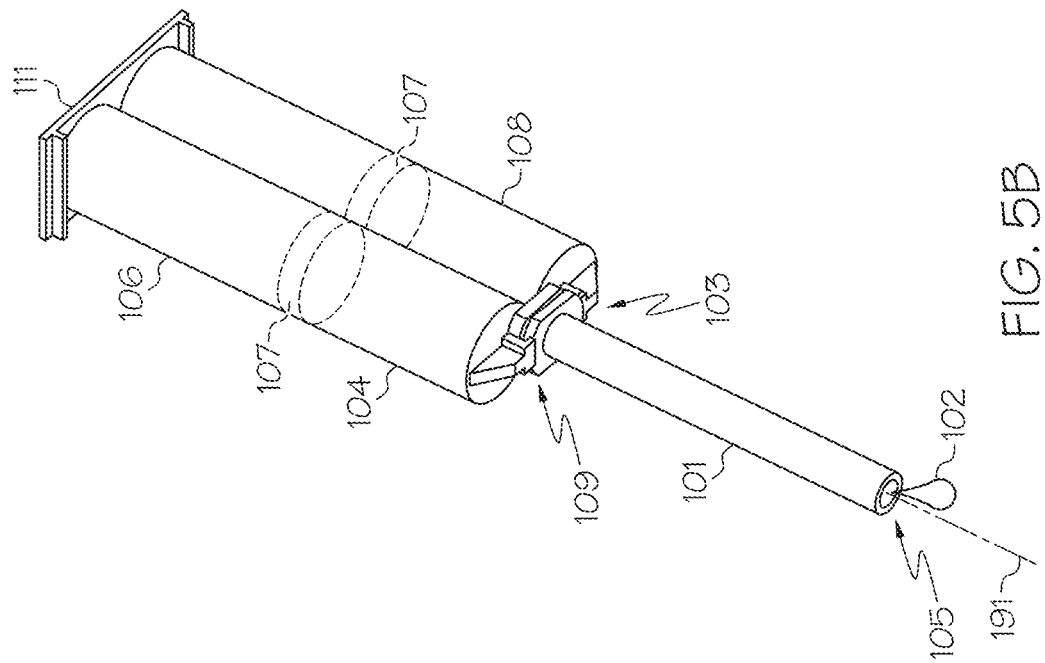
FIG. 5B is a schematic, perspective, assembled view of the two-part cartridge and static mixer of FIG. 5A, according to one or more examples of the subject matter, disclosed herein.
Figure 5A:
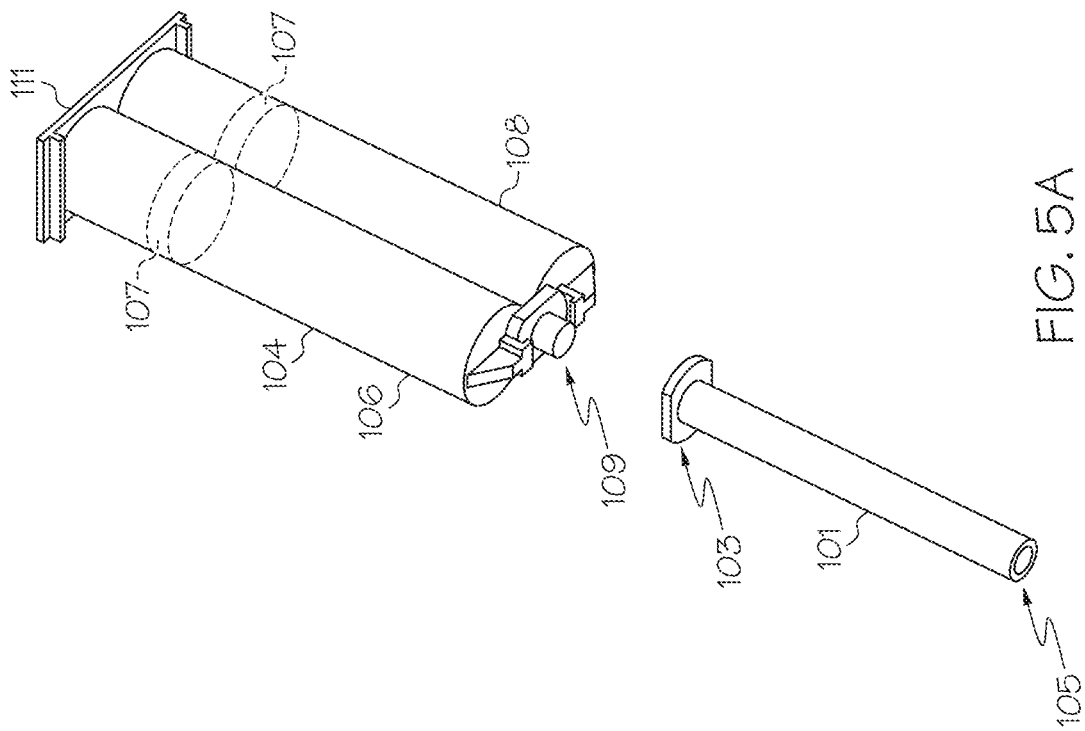
FIG. 5A is a schematic, perspective, exploded view of a two-part cartridge and static mixer for use with the robot end effector of FIG. 1, according to one or more examples of the subject matter, disclosed herein.

Referring generally to FIG. 1 and particularly to, e.g., FIGS. 4, 5A, and 5B, cartridge bays 122 are each oriented length-wise along first axis 190. Cartridge bays 122 are arranged side-by-side along second axis 192. When two-part cartridges 104 are received by cartridge bays 122, first-part container 106 and second-part container 108 of each of two-part cartridges 104 are oriented side-by-side along third axis 194. Third axis 194 is transverse to first axis 190 and to second axis 192. The preceding portion of this paragraph delineates example twenty of the subject matter, disclosed herein, where example twenty also encompasses any one of examples one to nineteen, above.

Cartridge bays 122 arranged side-by-side along second axis 192, and first-part container 106 and second-part container 108 of each of two-part cartridges 104 oriented side-by-side along third axis 194, provides efficient packing of two-part cartridges 104 within robot end effector 100 while enabling easy insertion and removal of two-part cartridges 104.

Referring generally to FIG. 1 and particularly to, e.g., FIG. 4, cartridge bays 122 are equal in number to pairs of fittings 152. The preceding portion of this paragraph delineates example twenty-one of the subject matter, disclosed herein, where example twenty-one also encompasses any one of examples one to twenty, above.

Pairs of fittings 152 and cartridge bays 122 being equal in number avoids a need to attach a single pair of fittings to each of cartridge bays 122 in succession.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus (es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A robot end effector for dispensing an extrudable substance, the robot end effector comprising:
 a chassis;

a mixer housing, extending from the chassis and configured to receive a static mixer, wherein the static mixer comprises a mixer inlet and a mixer outlet, which is in fluidic communication with the mixer inlet;

cartridge bays, extending from the chassis, wherein:
  each of the cartridge bays is shaped to receive a corresponding one of two-part cartridges;
  each one of the two-part cartridges comprises a cartridge outlet; and
  fluidic communication between the cartridge outlet of a selected one of the two-part cartridges and the mixer inlet is established when the cartridge bays are moved to a predetermined position with respect to the chassis, linearly along a first axis and linearly along a second axis, which is transverse to the first axis;

a dispensing valve, attached to the chassis and comprising a valve inlet and a valve outlet, wherein:
  the valve outlet is in selective fluidic communication with the valve inlet; and
  the mixer housing is configured to position the static mixer with respect to the dispensing valve so that the valve inlet is in fluidic communication with the mixer outlet; and a head assembly, comprising pairs of fittings, wherein each of the pairs of fittings is configured to selectively supply compressed air from a pressure source to contents of a corresponding one of the two-part cartridges when the two-part cartridges are received by the cartridge bays, and the cartridge bays are translated along the first axis and along the second axis relative to the chassis so that the cartridge outlet of the corresponding one of the two-part cartridges is in fluidic communication with the mixer inlet.

2. The robot end effector according to claim 1, further comprising a first actuator, attached to the chassis and operable to bi-directionally move the cartridge bays relative to the chassis along the first axis.

3. The robot end effector according to claim 2, wherein the first actuator is selectively operable to compress the static mixer between the cartridge outlet and the valve inlet by moving the cartridge bays relative to the chassis, so that the mixer inlet is fluidically coupled with the cartridge outlet of the selected one of the two-part cartridges while compressed air is supplied to the contents of the selected one of the two-part cartridges.

4. The robot end effector according to claim 2, wherein the first actuator is selectively operable to move the cartridge bays, relative to the chassis, along the first axis away from the predetermined position to fluidically decouple the mixer inlet from the cartridge outlet of the selected one of the two-part cartridges.

5. The robot end effector according to claim 2, wherein the first actuator is pneumatically activated.

6. The robot end effector according to claim 2, wherein: the first actuator comprises:
  a housing, fixed to the chassis; and
  a rod, oriented parallel to the first axis and translatable relative to the housing along the first axis.

7. The robot end effector according to claim 6, further comprising:
  an actuator interface, mounted on the rod; and
  a second actuator, mounted on the actuator interface and operable to bi-directionally move the cartridge bays relative to the chassis along the second axis.

8. The robot end effector according to claim 2, further comprising a second actuator, attached to the chassis and operable to bi-directionally move the cartridge bays relative to the chassis along the second axis.

9. The robot end effector according to claim 8, further comprising a connector, attached to the chassis, wherein the dispensing valve, the first actuator, and the second actuator are controllable by signals, received through the connector.

10. The robot end effector according to claim 8, wherein the second actuator is a stepper motor.

11. The robot end effector according claim 8, further comprising an actuator interface, wherein:
  the first actuator is configured to translate the actuator interface relative to the chassis; and
  the second actuator is operable to bi-directionally move the cartridge bays relative to the actuator interface along the second axis.

12. The robot end effector according to claim 11, further comprising:
  a guiderail, mounted to the cartridge bays; and
  a bracket, fixed to the actuator interface and movable relative to the guiderail along the second axis.

13. The robot end effector according to claim 8, further comprising:
  a pinion gear; and
  a rack gear, mounted to the cartridge bays and in mesh with the pinion gear, wherein the second actuator is operable to selectively rotate the pinion gear to selectively move the cartridge bays relative to the chassis along the second axis.

14. The robot end effector according to claim 1, wherein the head assembly is attached directly to the cartridge bays.

15. The robot end effector according to claim 1, further comprising a latch assembly, comprising:
  a tongue, fixed to one of the head assembly or the cartridge bays and comprising a groove;
  a lever, pivotally mounted to the other one of the head assembly or the cartridge bays; and
  a ring, pivotally mounted to the lever and configured to be received in the groove, wherein when the ring is received in the groove, the lever is operable to selectively tension the ring against the groove such that the head assembly is secured to the cartridge bays.

16. The robot end effector according to claim 15, further comprising a second latch assembly, positioned opposite the latch assembly along the second axis.

17. The robot end effector according to claim 1, wherein the cartridge bays collectively form a cartridge-bay assembly, comprising:
  a top wall; and
  openings, defined in the top wall and configured to receive the two-part cartridges therethrough into the cartridge bays.

18. The robot end effector according to claim 17, wherein:
  the head assembly further comprises a head plate; and
  each of the two-part cartridges further comprises a lip, configured to be sandwiched between the head plate and the top wall when the two-part cartridges are received in the cartridge bays.

19. The robot end effector according to claim 1, wherein:
  the head assembly further comprises supply valves; and
  each of the supply valves is operable to selectively establish fluidic communication between the pressure source and a corresponding one of the pairs of fittings.

20. The robot end effector according to claim 1, wherein:
  the cartridge bays are each oriented length-wise along the first axis;
  the cartridge bays are arranged side-by-side along the second axis;

when the two-part cartridges are received by the cartridge bays, a first-part container and a second-part container of each of the two-part cartridges are oriented side-by-side along a third axis; and the third axis is transverse to the first axis and to the second axis.

\* \* \* \* \*